United States Patent Office 3,277,536
Patented Oct. 11, 1966

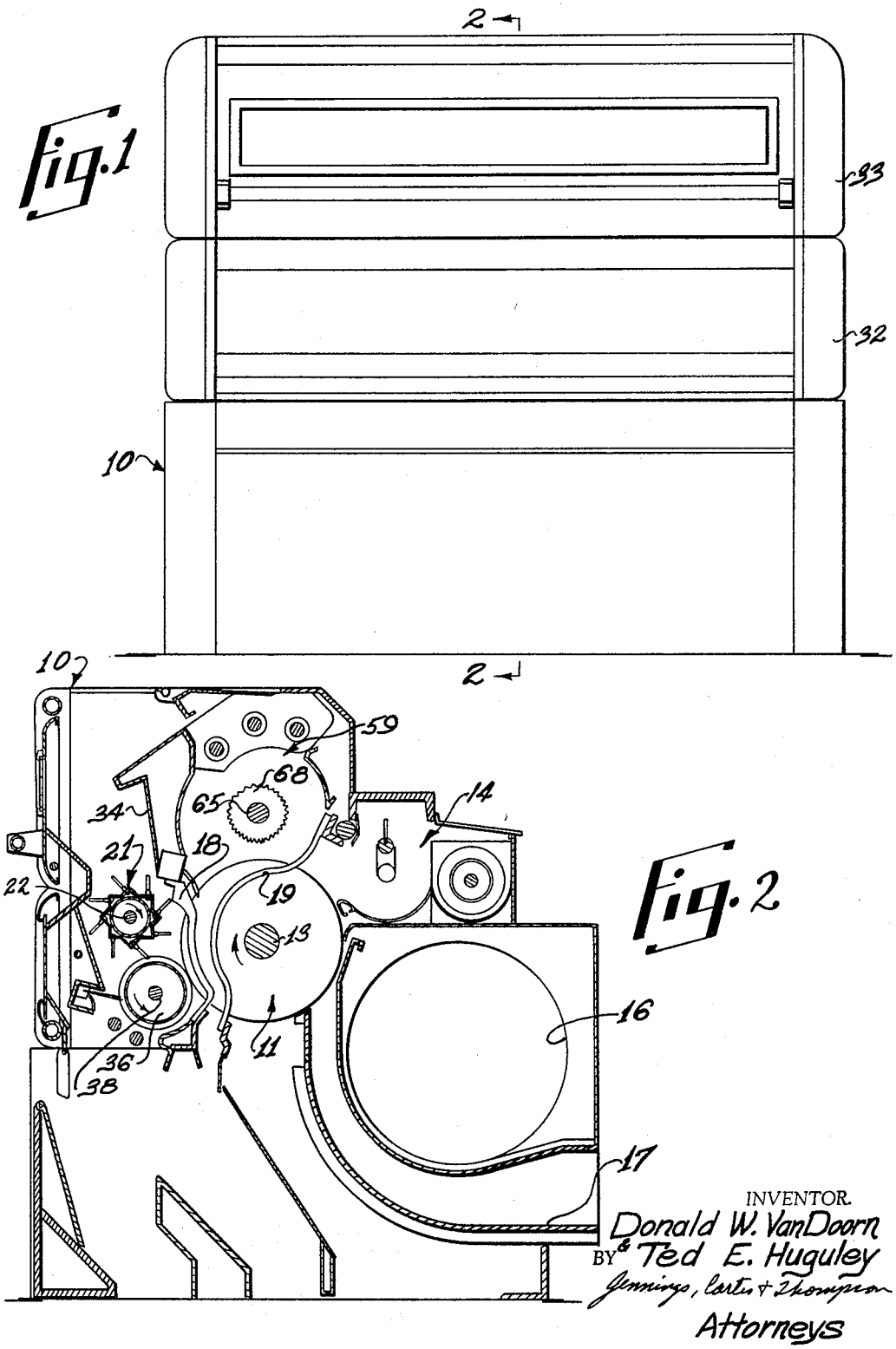

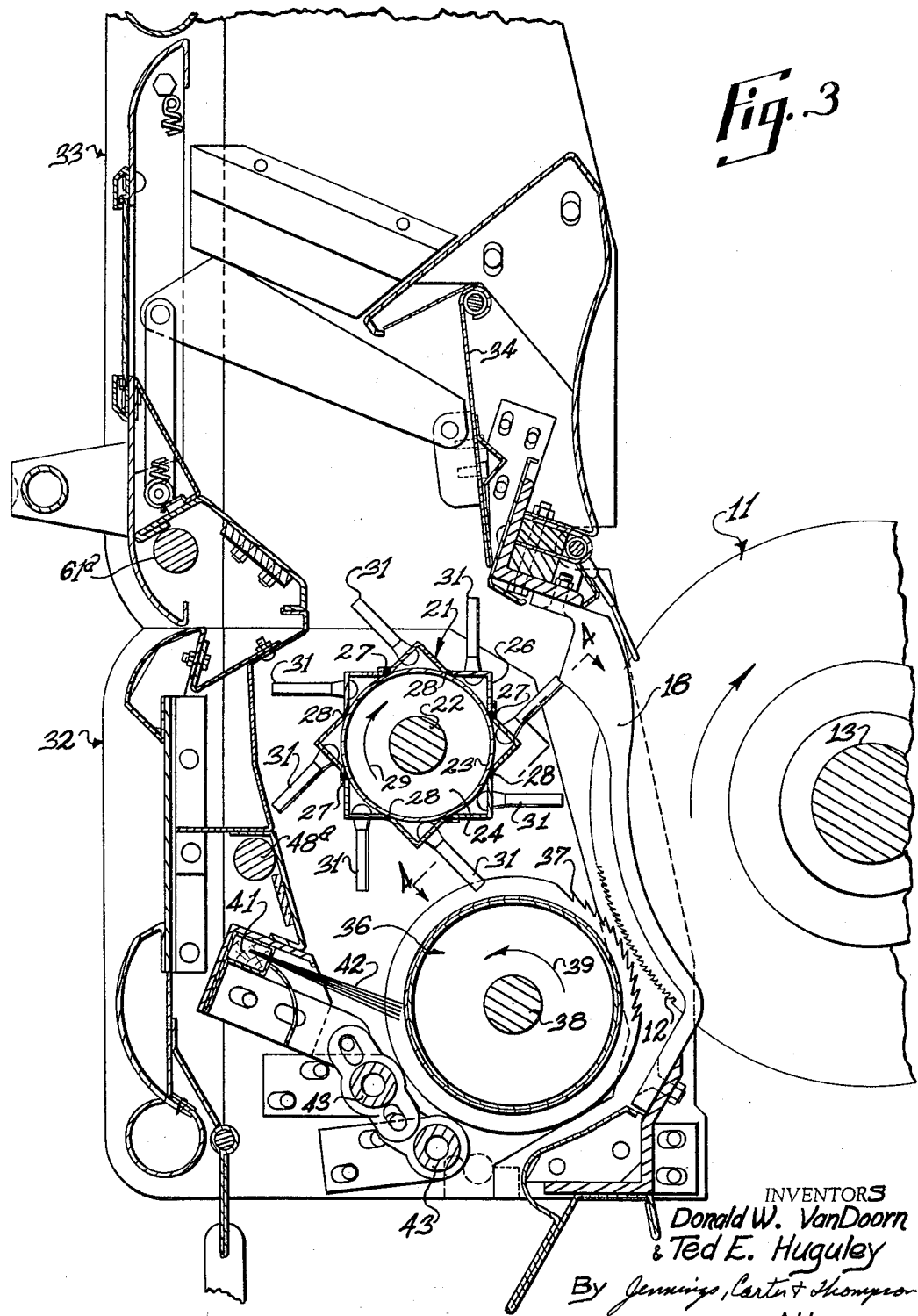

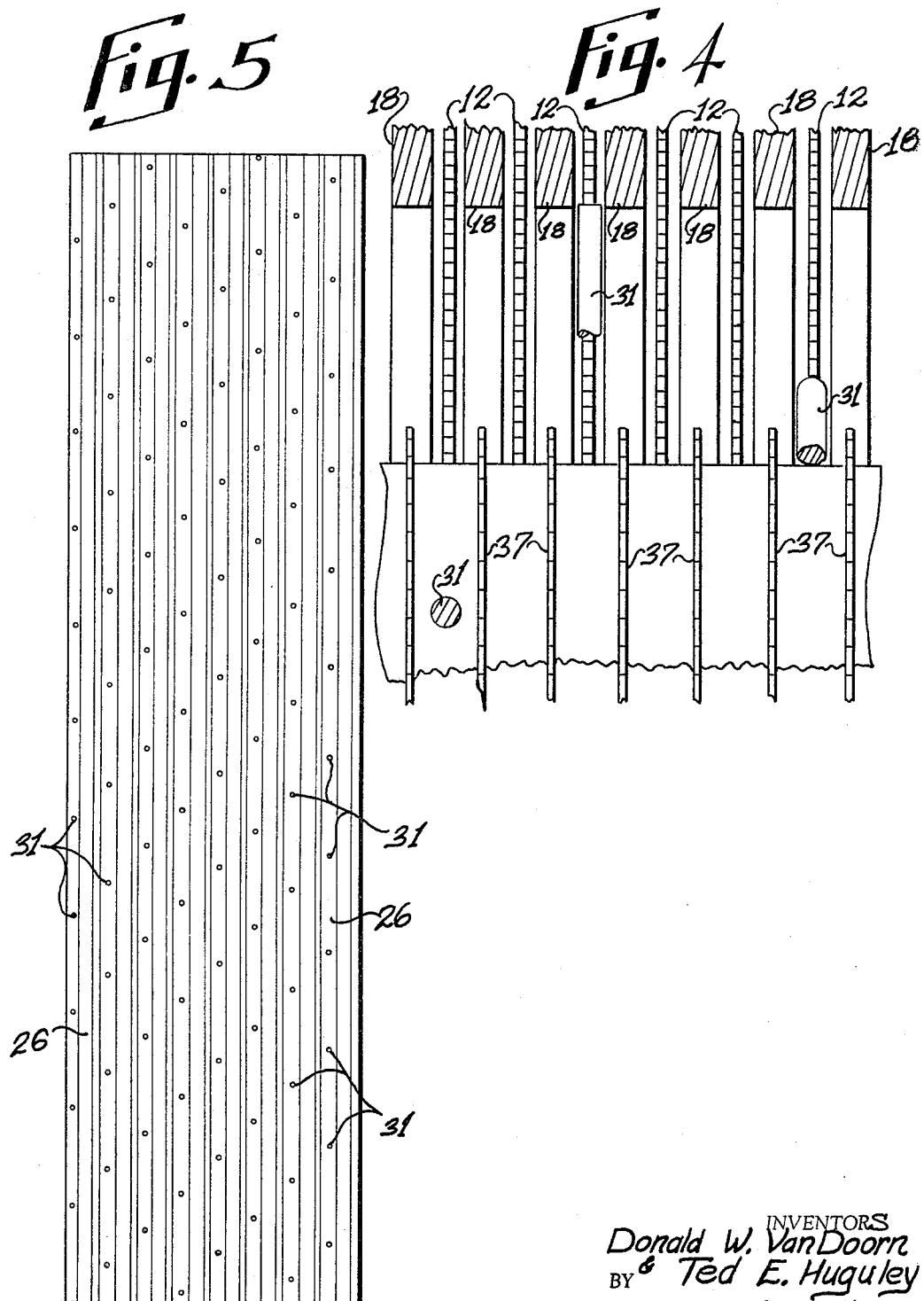

3,277,536
APPARATUS FOR GINNING COTTON AND SEPARATING FOREIGN PARTICLES THEREFROM
Donald W. Van Doorn and Ted E. Huguley, Columbus, Ga., assignors to Lummus Cotton Gin Company, a corporation of Georgia
Filed Dec. 30, 1963, Ser. No. 334,208
6 Claims. (Cl. 19—55)

This invention relates to a process and apparatus for separating foreign particles from seed cotton and ginning said cotton, and more particularly to such a process and apparatus which shall be effective to remove foreign particles, such as hulls, trash and the like, by a single pass of such foreign particles relative to the gin saw cylinder whereby the foreign particles are not crushed or disintegrated into small particle-size materials which become intermingled with the cotton fibers.

An object of our invention is to provide a process and apparatus for separating foreign particles from seed cotton and ginning said cotton in which the seed cotton is reclaimed from the foreign particles and then transferred immediately to the gin saw cylinder without being intermixed with the hulls, trash and the like, thereby maintaining the reclaimed seed cotton in a clean condition at all times and at the same time eliminating the necessity of providing auxiliary doffers and other apparatus for handling the reclaimed cotton.

Another object of our invention is to provide a process and apparatus for ginning cotton of the character designated in which improved means is provided for continuously cleaning the huller ribs, thereby eliminating a build-up of cotton, trash and the like adjacent the upper portions of the huller ribs.

Another object of our invention is to provide a process and apparatus of the character designated in which improved means is provided for continuously cleaning the area between adjacent saws of a reclaiming saw cylinder.

A more specific object of our invention is to provide apparatus for ginning cotton of the character designated in which the seed cotton is fed to the upgoing side of a gin saw cylinder by a spiked roller having outwardly projecting spikes which are spaced from each other a distance greater than the major dimensions of foreign particles carried by the cotton, thereby eliminating bridging of foreign materials between adjacent spikes.

A further object of our invention is to provide apparatus of the character designated which is particularly adapted for high speed ginning of mechanically harvested cotton wherein large quantities of foreign materials are effectively removed.

A still further object of our invention is to provide apparatus of the character designated which shall be simple of construction, economical of manufacture and which is particularly adapted for easy installation and maintenance.

Heretofore in the art to which our invention relates, various means have been devised for feeding seed cotton to the roll box of a gin. However, such feed means has not been entirely satisfactory due to the fact that there is often a build-up of materials, such as lint and foreign materials carried thereby, adjacent the upper portion of the huller ribs. That is, since the huller ribs are mounted adjacent the upgoing sides of the gin saw cylinder, there is a build-up of materials adjacent the upper ends of the huller ribs. While spiked rollers have been employed to feed the seed cotton, such rollers have been unsatisfactory in operation due to the fact that the spikes are positioned close enought to each other to permit bridging of materials whereby there is often a build-up of materials on the spiked roller which prevents proper operation of the roller.

Furthermore, it has been a practice to reclaim seed cotton which is not transferred immediately to the gin saw cylinder by providing a slowly revolving saw cylinder operating directly over and closely adjacent a curved trough onto which the commingled trash and cotton to be reclaimed fall. The closeness of the trough to the bottom side of the revolving saw cylinder presses the cotton onto the teeth of the saw cylinder and the cotton is dragged through the trough imbedding much of the trash into the cotton which is then carried upward by the saw cylinder to a doffing cylinder which in turn directs the cotton and imbedded trash to the main ginning saws to be carried thereby into the roll box of the gin. In such apparatus the reclaimed cotton is not only contaminated with trash but this apparatus also requires complicated drive mechanism and more power.

To overcome these and other difficulties, we provide apparatus wherein the foreign particles, such as hulls, trash and the like, make a single pass relative to the gin saw cylinder and then fall freely out of contact with the cotton to be reclaimed, thereby preventing the imbedding of the foreign particles into the cotton. The seed cotton and the foreign particles carried thereby are fed to the upgoing side of the gin saw cylinder by a spiked roller having outwardly projecting spikes which are in position to convey the materials, clean the upper portion of the huller ribs and clean the space between adjacent saws of a reclaimer saw cylinder. The cotton to be reclaimed is transferred directly to the reclaimer saw cylinder which in turn transfers the cotton immediately into direct engagement with the gin saw cylinder whereupon the cotton is doffed by the gin saw cylinder.

Apparatus embodying features of our invention is illustrated in the accompanying drawings, forming a part of this application in which:

FIG. 1 is a front elevational view of a gin embodying our improvement;

FIG. 2 is a sectional view taken generally along the line 2—2 of FIG. 1;

FIG. 3 is an enlarged sectional view showing the upper huller head and the lower huller head and the gin saw cylinder associated therewith;

FIG. 4 is an enlarged sectional view taken generally along the line 4—4 of FIG. 3;

FIG. 5 is a developed view showing the outer surface of the spiked roller; and,

Figure 6:
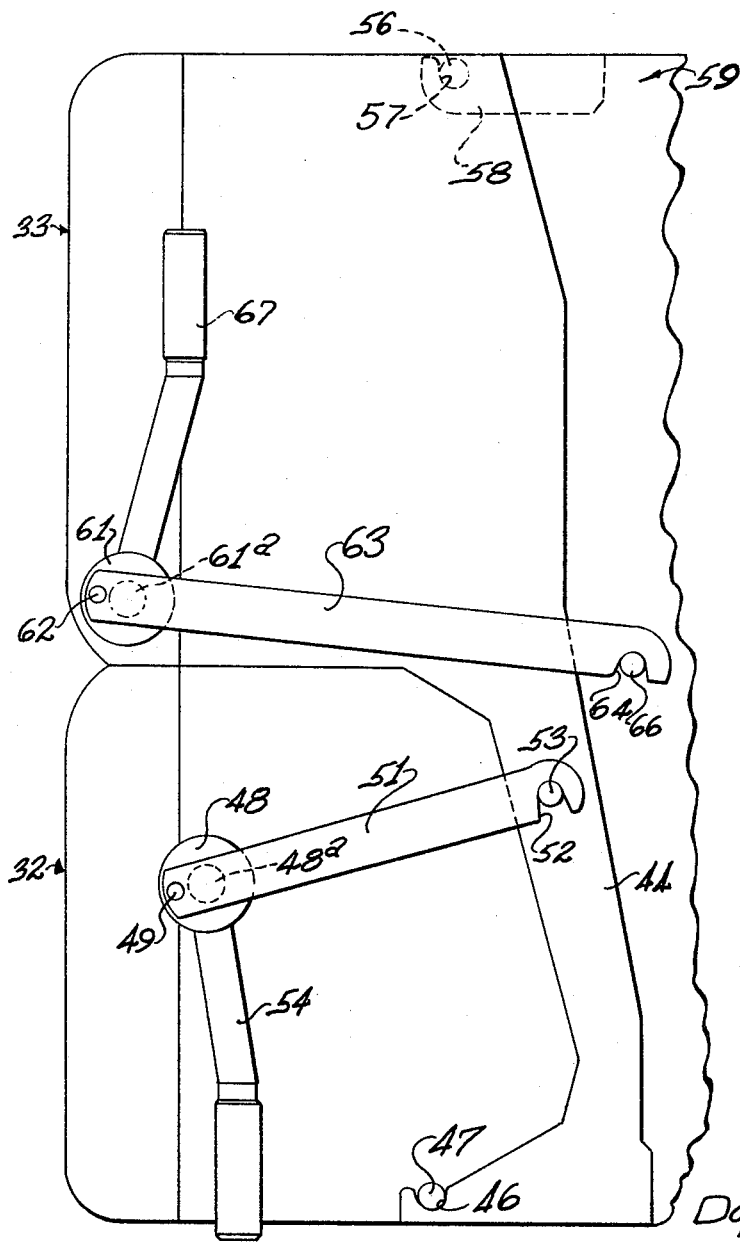
FIG. 6 is an enlarged, diagrammatic view showing the means for holding the upper and lower huller heads in place and the means for removing the huller heads from the remainder of the gin apparatus.

Referring now to the drawings for a better understanding of our invention, we show our invention associated with a saw type gin of the air-blast type. The gin stand indicated generally at 10 includes a gin saw indicated generally at 11 which is made up of a plurality of individual saws 12, as shown in FIG. 4. The gin saw cylinder 11 is mounted on a shaft 13 which in turn is mounted in suitable bearings and driven from a source of power, not shown. A mote unit is indicated generally at 14 and an air-blast chamber is indicated generally at 16. Lint is doffed from the saws 12 by the air blast into a lint duct 17 in a manner well understood in the art. The gin is provided with huller ribs 18 and ginning ribs 19, as shown in FIG. 2.

Our invention comprises the means for feeding the seed cotton and foreign particles carried thereby to the gin saw cylinder and the means for reclaiming cotton which is not transferred to the gin saw cylinder upon a first pass relative thereto, together with means for maintaining the feed means, huller ribs and the reclaiming means in a clean condition at all times. The seed cotton and foreign particles carried thereby are conveyed downwardly into contact with the upgoing side of the gin saw cylinder 11 by a spiked roller 21 which is mounted on a driven shaft 22. The spiked roller 21 comprises a cylinder 23 having opposite ends thereof secured to disc-like members 24 which in turn are secured to the shaft 22.

Secured to the cylinder 23 and extending longitudinally thereof are a series of elongated angle members 26. As shown in FIG. 3, each angle member 26 is formed so as to include a pair of right angles. Adjacent angle members 26 are secured to each other as at 27 by suitable means, such as by welding. Also, the portion of the angle members 26 intermediate the right angles formed therein contact the cylinder 23 and are secured thereto as by welding at 28. The shaft 22 is driven by suitable means, not shown, in the direction of the arrow 29 whereby the entire spiked roller assembly rotates in this direction. The leading leg of each right angle formed in the angle member 26, as viewed in the direction of rotation of the spiked roller 21, thus forms an impeller which assists in conveying the seed cotton and the foreign particles associated therewith downwardly in a curved pass relative to the upgoing side of the gin saw cylinder 11. Secured to and projecting outwardly from the trailing leg of each of the right angle members formed in the angle member 26, as viewed in the direction of rotation of the spiked roller, are a series of longitudinally spaced spikes 31. We provide one spike 31 for each gin saw 12 and each spike is of a length to project slightly inwardly of adjacent huller ribs 18, as shown in FIG. 4. Accordingly, the spike 31 for each saw 12 not only conveys the seed cotton into direct engagement with the saw cylinder, but the end of the spike engages any material between the huller ribs 18 above the gin saw whereby it is moved downwardly and inwardly toward the gin saw to thereby maintain the upper portion of the huller ribs 18 in a clean condition at all times. That is to say, the downward movement of the spikes 31 relative to the huller ribs 18 move the materials collected between the huller ribs in a direction opposite the direction of movement imparted thereto by the gin saws 11.

In FIG. 5 of the drawings, we show a developed view of the spiked roller whereby the relative position of the spikes to each other may be readily seen. The spikes 31 are spaced from each other a distance greater than the major dimensions of foreign particles carried by the cotton whereby individual foreign particles cannot span adjacent spikes to thus bring about bridging of materials on the spiked roller. For example, where eight elongated angle bars are provided and the spacing between adjacent saws is approximately .76266 inch, the spikes 31 adjacent one end of the spiked roller are positioned the following distances from that end:

| Angle Member: | Distance from end of spiked roller in inches |
|---|---|
| No. 1 | 0 |
| No. 2 | 2.28798 |
| No. 3 | 4.57596 |
| No. 4 | 0.76266 |
| No. 5 | 3.05064 |
| No. 6 | 6.10128 |
| No. 7 | 1.52532 |
| No. 8 | 3.81330 |

Also, where eight angle members are employed, the individual spikes 31 are spaced from each other along their respective angle bars a distance equal approximately eight times .76266 or approximately 6.10128 inches. It will thus be seen that the individual spikes 31 are spaced from each other a distance sufficient to prevent spanning of foreign particles, thereby preventing bridging or the build-up of foreign particles between adjacent spikes. It is very desirable to prevent such bridging of foreign particles on the spiked roller for the reason that where such bridging occurs, the spiked roller becomes logged.

As shown in FIGS. 2 and 3, the shaft 22 for the spiked roller 21 is mounted for rotation within a lower huller head indicated generally at 32. Seed cotton and the foreign particles associated therewith, such as hulls, trash and the like, are introduced to the lower huller head by an upper huller head indicated generally at 33. The upper huller head 33 is provided with the usual fire valve 34 which is actuated in a manner well understood in the art. As shown in FIG. 1, the upper huller head 33 is mounted above and extends the length of the lower huller head 32.

Mounted for rotation alongside the gin saw cylinder 11 subjacent the spiked roller 21 is a reclaimer saw cylinder 36 having individual saws 37 which are spaced from each other, as shown in FIG. 4, whereby each saw 37 is positioned equidistant between adjacent gin saws 12. Also, the spikes 31 are of a length to pass between the saws 37, as shown in FIGS. 3 and 4, whereby the area between adjacent saws 37 is maintained in a clean condition at all times. The reclaimer saw cylinder 36 is mounted on a driven shaft 38 which is mounted in suitable bearings and driven by suitable drive means, not shown. The reclaimer saw cylinder 36 is driven in the direction of the arrow 39 and is driven at a surface speed less than the surface speed of the gin saw cylinder 11 whereby the cotton carried by the reclaimer saw cylinder is doffed by the gin saw cylinder 11. It will be noted that the teeth of the saws 37 on the reclaimer saw cylinder extend forwardly in the direction of rotation thereof. In actual practice, we have found that with a 12-inch gin saw cylinder 11, our improved apparatus operates satisfactorily in every respect where the gin saw cylinder 11 is driven at a surface speed of approximately 2,825 feet per minute and the reclaimer saw cylinder 36 is driven at a surface speed of approximately 625 feet per minute. Where these speeds are employed, the spiked roller 21 is driven at a surface speed of approximately 850 feet per minute.

To direct the foreign particles and any cotton carried thereby onto the reclaimer saw cylinder 36, we mount a brush member 41 adjacent the downgoing side of the reclaimer saw cylinder, as shown in FIG. 3. The brush 41 extends longitudinally of the reclaimer saw cylinder 36 and has downwardly and inwardly extending bristles 42 which extend adjacent the periphery of the reclaimer saw cylinder.

Adjustable grid rods 43 extend across the lower huller head 32, as shown in FIG. 3, whereby foreign particles, such as hulls and the like are free to drop downwardly into a suitable receptacle therefor whereupon they are removed in a manner well understood in the art.

As shown in FIG. 6, the upper huller head 33 carries a depending member 44 having an upwardly opening slot 46 adjacent the lower end thereof. The lower huller head 32 carries outwardly projecting pins 47 adjacent the lower end thereof in position to engage the recess 46 whereby it moves with the upper huller head 33 and may be removed therefrom by moving the pin 47 outwardly of the recess 46. To facilitate removal of the lower huller head 32 from the upper huller head 33, we mount rotary members 48 at opposite sides of the lower huller head on a shaft 48a. Pivotally connected to a side of the rotary member 48 by a suitable pivot pin 49 is one end of a link 51. The other end of the link 51 is provided with a downwardly opening slot 52 therein for receiving an outwardly projecting pin 53 carried by the depending member 44. A handle member 54 is connected to the rotary member 48 whereby rotary motion may be imparted thereto. Accordingly, upon rotation of the handle 54 and the rotary member 48, the upper portion of the lower huller head 32 is moved outwardly whereupon it may be easily removed from the recesses 46.

The upper huller head 33 is provided with outwardly projecting pins 56 at opposite sides thereof in position to engage an upwardly opening slot 57 carried by brackets 58 which in turn are secured to the roll box head indicated generally at 59. A rotary member 61 is mounted at opposite sides of the upper huller head 33 on a shaft 61ª. Pivotally connected to each rotary member 61 by an outwardly projecting pin 62 is one of a link 63. The other end of the link 63 is provided with a downwardly opening slot 64 for receiving an outwardly projecting pin 66 carried by the roll box head. An operating handle 67 is connected to each rotary member 61 for actuating the same. Accordingly, upon movement of the handle 67 to the left, as viewed in FIG. 6, the lower portion of the upper huller head 33 is moved outwardly whereupon it may be readily removed from the upwardly opening slot 57.

Mounted within the roll box 59 in suitable bearings is a shaft 65 which carries a plurality of disc-like members 68. The disc-like members 68 preferably have teeth on the periphery thereof and the discs are placed at an angle to the longitudinal axis of the shaft 65 to thus provide in effect a plurality of wobble members. After the roll builds up around the shaft 65 and the disc-like members 68 and fills the space in the roll box 59, the disc-like members cause the seed roll, and particularly that portion of the periphery of the seed roll adjacent the saws, to oscillate axially in the roll box while it is rotating. This action of the disc-like members causes the saws 12 to engage fresh, non-grooved places in the roll, thereby greatly increasing the efficiency of the gin.

From the foregoing description, the operation of our improved apparatus and the manner in which our improved process is carried out will be readily understood. The seed cotton and the foreign particles carried thereby, such as hulls, trash and the like, are fed downwardly into the gin in the usual manner. The seed cotton thus passes downwardly through the upper huller head into the lower huller head whereupon it is transferred by the spiked roller 21 in a downward direction into engagement with the upgoing side of the gin saw cylinder 11. The seed cotton is thus picked up by the saws 12 and is drawn into the roll box 59, forming a seed roll about the disc-like members 68. Foreign particles, such as hulls, trash and the like, are then conveyed downwardly onto the upper surface of the reclaimer saw cylinder 36 whereupon the foreign particles and cotton carried thereby are moved in a direction away from the gin saw cylinder 11. The foreign particles and cotton carried thereby are directed downwardly and inwardly alongside the downgoing side of the reclaimer saw cylinder by the bristles 42 whereby the cotton carried by the foreign particles is picked up by the saws 37. The cotton is then doffed from the saws 37 by the gin saw cylinder 11 whereby the cotton remains in contact with the foreign particles a minimum of time. That is, the foreign particles make a single pass relative to the gin saw cylinder 11 whereupon they are directed by the spiked roller 21 and the upper surface of the reclaimer saw cylinder 31 in a direction away from the gin saw cylinder 11. The minor portion of the cotton which remains with the trash is then picked up by the reclaimer saw cylinder 36 whereupon it is immediately transferred to the gin saw cylinder 11. The foreign particles are thus discharged downwardly between the adjustable grid rods 43 due to centrifugal force and gravity and are removed from the apparatus by suitable means. The relatively high surface speed and small diameter of the reclaimer saw develop centrifugal forces sufficient to tear the foreign matter free from the cotton held firmly by the reclaimer saw teeth. The grid rods act both to help strip the trash free from the cotton and to assure that the cotton remains firmly impaled on the saw teeth of the reclaimer saw. The lint is doffed from the saws 12 of the gin saw cylinder 11 by the air blast into the lint duct 17 in the usual manner.

From the foregoing, it will be seen that we have devised an improved process and apparatus for ginning cotton and separating foreign particles therefrom. By continuously conveying the seed cotton and the foreign particles associated therewith into contact with the upgoing side of the gin saw cylinder by our improved spiked roller, the cotton is fed to the gin saw cylinder in a uniform manner. Also, by providing spikes on the spiked roller which move in close proximity to the huller ribs, any accumulation of materials between the huller ribs is continuously moved downwardly and inwardly toward the gin saws, thereby maintaining the space between the huller ribs in a clean condition. Also, by causing the spikes of the spike roller to move between adjacent saws of the reclaimer saw cylinder, the reclaimer saw cylinder is continuously cleaned. The spacing of the spikes from each other a distance greater than the maximum dimension of foreign particles carried by the cotton eliminates bridging of foreign particles between adjacent spikes, thereby maintaining the spiked roller in a clean condition for uniform and trouble-free operation. That is, there is no build-up of foreign materials on the spiked roller which would cause logging. The spikes 31 of said spiked roller 21 are spaced from each other a distance whereby the combined distance covered by any three aligned spikes is greater than the major dimensions of foreign particles carried by the cotton. This prevents sticks and the like from being lodged between three aligned spikes. Furthermore, by preventing the foreign particles, such as hulls and the like, from remaining in contact with the gin saw cylinder or other mechanism for a substantial length of time, the foreign particles are not crushed and disintegrated whereby they become intermingled with the seed cotton. The immediate removal of the reclaimed cotton from the foreign particles without intimately contacting one another also reduces the imbedding of foreign particles into the reclaimed cotton.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. The combination with a cotton gin embodying huller ribs and a rotating gin saw cylinder disposed to draw seed cotton between the huller ribs to separate foreign particles therefrom, of:
    (a) a spiked roller mounted alongside the gin saw cylinder with the spikes thereof spaced from each other,
    (b) means to rotate said spiked roller in the same direction as the direction of rotation of the gin saw cylinder whereby seed cotton and foreign particles carried thereby are delivered to the periphery of the gin saw cylinder,
    (c) a reclaimer saw cylinder mounted subjacent said spiked roller and alongside said gin saw cylinder with the teeth of said reclaimer saw cylinder adjacent the teeth of said gin saw cylinder,
    (d) the ends of the spikes on said spiked roller projecting outwardly in position to move inwardly between adjacent saws of the reclaimer saw cylinder, and
    (e) means to rotate said reclaimer saw cylinder in a direction opposite the direction of rotation of said gin saw cylinder and at a surface speed less than the surface speed of said gin saw cylinder whereby foreign particles are conveyed away from the gin saw cylinder and cotton carried by the foreign particles is transferred to said reclaimer saw cylinder and is then doffed by said gin saw cylinder.

2. The combination with a cotton gin as defined in claim 1 in which the ends of the spikes on the spiked roller project outwardly in position to move closely adjacent the huller ribs prior to moving between the saws of said reclaimer saw cylinder.

3. The combination with a cotton gin as defined in claim 1 in which the ends of the spikes on the spiked roller project outwardly in position to move slightly inward between adjacent huller ribs prior to moving between the saws of said reclaimer saw cylinder.

4. The combination with a cotton gin as defined in claim 1 in which a single spike is provided for each saw of the reclaimer saw cylinder.

5. The combination with a cotton gin as defined in claim 1 in which the spiked roller is rotated at a surface speed less than the surface speed of the gin saw cylinder and at a surface speed greater than the surface speed of the reclaimer saw cylinder.

6. The combination with a cotton gin as defined in claim 1 in which the spikes of the spiked roller are carried by angle-like members which extend longitudinally of the spiked roller and define angularly spaced impeller surfaces to aid in conveying cotton and foreign particles carried thereby toward said gin saw cylinder with each spike extending generally parallel to the impeller surface adjacent and preceding said spike, as viewed in the direction of rotation and said reclaimer saw cylinder.

References Cited by the Examiner
UNITED STATES PATENTS

| | | | |
|---|---|---|---|
| 1,496,385 | 6/1924 | Sherman | 19—56 |
| 1,724,500 | 8/1929 | Mitchell | 19—35 |
| 1,887,562 | 11/1932 | Mitchell | 19—38 X |
| 2,155,181 | 4/1939 | Deems | 19—55 |
| 2,902,722 | 9/1959 | Wallace | 19—37 X |
| 3,162,902 | 12/1964 | Wallace | 19—55 X |

MERVIN STEIN, *Primary Examiner.*

DORSEY NEWTON, *Examiner.*